US011696090B2

(12) United States Patent
Tu

(10) Patent No.: US 11,696,090 B2
(45) Date of Patent: Jul. 4, 2023

(54) LOCATION-BASED CURBSIDE DELIVERY

(71) Applicant: Aldelo, LP, Pleasanton, CA (US)

(72) Inventor: Harry Tu, Pleasanton, CA (US)

(73) Assignee: Aldelo, LP, Pleasanton, CA (US)

( * ) Notice: Subject to any disclaimer, the term of this patent is extended or adjusted under 35 U.S.C. 154(b) by 215 days.

(21) Appl. No.: 17/184,062

(22) Filed: Feb. 24, 2021

(65) Prior Publication Data
US 2021/0352433 A1 Nov. 11, 2021

Related U.S. Application Data

(60) Provisional application No. 63/020,480, filed on May 5, 2020.

(51) Int. Cl.
*H04W 4/021* (2018.01)
*G06Q 10/08* (2023.01)
*H04W 4/02* (2018.01)
*H04W 4/029* (2018.01)

(52) U.S. Cl.
CPC ............ *H04W 4/023* (2013.01); *G06Q 10/08* (2013.01); *H04W 4/021* (2013.01); *H04W 4/026* (2013.01); *H04W 4/029* (2018.02)

(58) Field of Classification Search
CPC ..... H04W 4/023; H04W 4/029; H04W 4/021; H04W 4/026; G06Q 10/08
USPC ...................................................... 455/456.3
See application file for complete search history.

(56) References Cited

U.S. PATENT DOCUMENTS

| 6,435,406 | B1 | 8/2002 | Pentel | |
|---|---|---|---|---|
| 9,129,289 | B2 | 9/2015 | Vaughn et al. | |
| 10,304,147 | B2 | 5/2019 | Kelly et al. | |
| 10,373,281 | B2 | 8/2019 | Lutnick et al. | |
| 10,640,357 | B2 | 5/2020 | Burks et al. | |
| 2007/0205278 | A1 | 9/2007 | Lovett | |
| 2013/0346237 | A1* | 12/2013 | Rademaker | G06Q 10/0836 705/26.8 |
| 2016/0189287 | A1 | 6/2016 | Van Meter | |
| 2016/0247113 | A1 | 8/2016 | Rademaker | |
| 2016/0275470 | A1 | 9/2016 | Straw et al. | |
| 2019/0066046 | A1* | 2/2019 | Nathani | H04W 4/023 |

* cited by examiner

*Primary Examiner* — Ted M Wang
(74) *Attorney, Agent, or Firm* — Fish & Richardson P.C.

(57) ABSTRACT

This specification generally relates to a method and system for providing curbside pickup. In one example method, an order to be fulfilled via curbside delivery is received at a merchant, where the order is associated with a first entity. The merchant receives a notification of arrival of the first entity to or within a pre-determined area associated with the merchant, where the notification includes location information associated with the first entity. The merchant can then generate a set of directions for a second entity to travel to reach the first entity based on the location information associated with the first entity, and can present the generated set of directions to the second entity for completing the curbside delivery. The merchant can then receive a confirmation of the delivery after interactions between the second entity and the first entity at the first entity's location.

30 Claims, 3 Drawing Sheets

LOCATION-BASED CURBSIDE DELIVERY

CROSS-REFERENCE TO RELATED APPLICATIONS

This application claims the benefit of U.S. Provisional Application Ser. No. 63/020,480 filed on May 5, 2020, the entire contents of which are incorporated by reference in its entirety.

TECHNICAL FIELD

This specification generally relates to an improved method and system for providing curbside pickup in non-traditional locations and with increased flexibility.

BACKGROUND

In general, curbside pickup is the concept of products being delivered by a merchant (e.g., by its staff or a delegate thereof) to a consumer located near a merchant's place of business (e.g., their store), such as at a literal curb of the business. In many instances, the consumer may be located in a car or vehicle. In some instances, however, the consumer may also be outside or near their vehicle. In still other instances, the consumer may be on foot, or may be apart from their vehicle, and may be instead be physically located near the store, but not associated with a particular vehicle. In each case, however, instead of the consumer going into the store to acquire or pick up the products, the ordered products are delivered to the consumer after their arrival at a location near the merchant's store, with the delivery or exchange occurring at the location of the consumer's vehicle or to a location of the consumer's person.

SUMMARY

The present disclosure involves systems, software, and computer-implemented methods for improved curbside delivery at a restaurant or other retailer of pre-purchased or pre-ordered good. An example method includes receiving an order to be fulfilled via curbside delivery at a merchant, where the order is associated with a first entity. The merchant receives a notification of arrival of the first entity to or within a pre-determined area associated with the merchant, where the notification includes location information associated with the first entity. The merchant can then generate a set of directions for a second entity to travel to reach the first entity based on the location information associated with the first entity, and can present the generated set of directions to the second entity for completing the curbside delivery. The merchant can then receive a confirmation of the delivery after interactions between the second entity and the first entity at the first entity's location.

In some instances, the notification of arrival is automatically generated in response to the first entity arriving within the pre-determined area associated with the merchant. In some of those instances, the automatic generation of the notification of arrival is performed by a mobile device of the first entity, where the automatic generation is performed in response to the mobile device of the first entity detecting arrival within pre-determined area associated with the merchant.

In some other instances, the notification of arrival is manually generated by a mobile device of the first entity, wherein a user interface (UI) element associated with initiating the notification of arrival is not unavailable to be activated prior to the first entity's arrival within the pre-determined area associated with the merchant. The UI element associated with initiating the notification of arrival is available to be activated after the first entity's arrival within the pre-determined area associated with the merchant. In those instances, the method can further include, after the UI element associated with initiating the notification of arrival is available to be activated, receiving, at the merchant, the notification of arrival based on a manual interaction with the mobile device of the first entity to activate the UI element.

In some instances, the location information associated with the first entity included with the notification of arrival includes a current location of a mobile device associated with the first entity within the pre-determined area associated with the merchant. In some of those instances, the current location of the mobile device associated with the first entity is determined based on a global positioning satellite (GPS) or assisted GPS (aGPS) location obtained by the mobile device at a time the notification of arrival is transmitted from the mobile device.

The method can further include, after presenting the generated set of directions to the second entity for completing the curbside delivery and prior to receiving the confirmation of completed delivery, receiving, at the merchant, a second notification associated with updated location information associated with the first entity, the updated location information identifying a new location within the pre-determined area associated with the merchant. In response to receiving the second notification, an updated set of directions for the second entity to travel from the second entity's current location to the new location of the first entity associated with the updated location information can be generated, and the updated, and the updated set of directions can be presented to the second entity for completing the curbside delivery.

In some instances, the second entity comprises a mobile device associated with a staff member of the merchant. In some of those instances, presenting the generated set of directions to the second entity for completing the curbside delivery comprises transmitting the generated set of directions to the mobile device associated with the staff member of the merchant. In some of those instances, the first entity can be associated with a unique identifier, wherein the unique identifier is associated with the order. In those instances, transmitting the generated set of directions to the mobile device associated with the staff member of the merchant includes providing the unique identifier associated with the order to the mobile device associated with the staff member of the merchant, and receiving the confirmation of completed delivery after interaction of the second entity with the first entity at the location of the first entity comprises obtaining a confirmation from the mobile device of the second entity that the unique identifier is associated with the first entity in order to complete the order and confirm delivery. In some of those instances, the unique identifier can be a driver's license number, a vehicle license plate number, a VIN number of the vehicle, or a biometric set of information associated with the first entity. Still further, obtaining the confirmation from the mobile device of the second entity that the unique identifier is associated with the first entity comprises capturing the unique identifier using a camera of the mobile device of the second entity and comparing the captured unique identifier to the unique identifier associated with the order.

While generally described as a computer-implemented software embodied on tangible and non-transitory media that processes and transforms the respective data, some or all of the aspects may be computer-implemented methods or further included in respective systems or other combinations of devices for performing the described functionality. The details of these and other aspects and embodiments of the present disclosure are set forth in the accompanying drawings and the description below. Other features, objects, and advantages of the disclosure will be apparent from the description and drawings, and from the claims.

DETAILED DESCRIPTION

Figure 1:
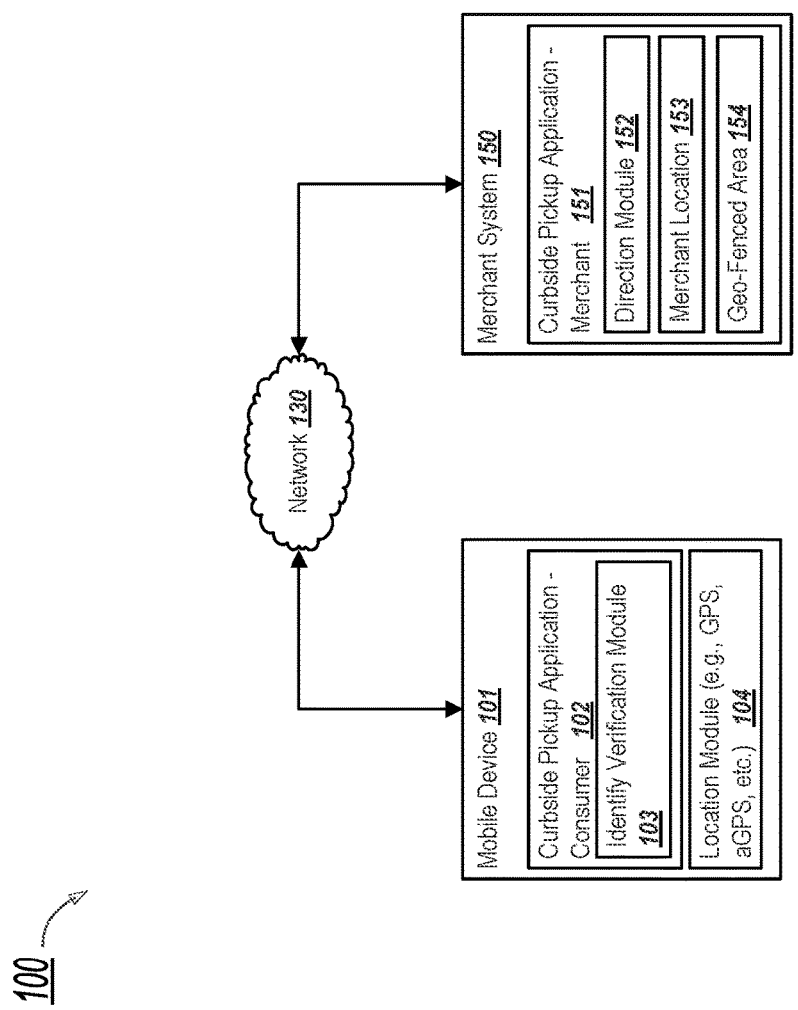
FIG. 1 is a block diagram illustrating an example system providing improved curbside delivery operations in accordance with implementations of the present disclosure.

The specification generally relates to techniques and technological improvements to solutions for curbside pickup of pre-purchased or pre-ordered goods. In general, curbside pickup is the concept of products delivered by a merchant (e.g., by its staff or a delegate thereof) to a consumer or customer located near a merchant's place of business (e.g., their store). In many instances, the consumer may be located in a car or vehicle. In some instances, however, the consumer may also be outside or near their vehicle. In still other instances, the consumer may be on foot, or may be apart from their vehicle, and, instead, may be physically located near the store, but not associated with a particular vehicle. In each case, however, instead of the consumer going into the store to acquire or pick up the products, the ordered products are delivered to the consumer after their arrival at a location near the merchant's store, with the delivery or exchange occurring at the location of the consumer's vehicle or to a location of the consumer's person.

In one example situation, a consumer may order a meal online or by phone from a restaurant, and can later arrive to the restaurant's parking lot or location. Instead of walking into the store to receive or pick up the order, curbside service allows social interaction to be limited, and store staff can bring the products out to the vehicle and/or a location of the consumer for delivery. In some cases, stores may have designated parking spots or a designated location at which persons picking up such orders can wait. In many other instances, however, no additional room may be available for or dedicated to curbside pickups and delivery.

Similar situations can be used for non-food orders, such as ordering products and materials from hardware, equipment, supply, and technology stores, as well as grocery, convenience, and pharmaceutical businesses, among others. In each instance, consumers may be able to order online or over the phone, and can notify the merchant upon arrival to have the merchant's staff deliver the goods to the consumer's vehicle or location without the consumer needing to enter the store.

In general, curbside pickup provides significant convenience to customers in terms of time savings. For merchants, curbside pickup is helpful as they may be able to serve more consumers, particularly when the actual facility may not be large enough to handle inbound physical traffic. Further, in situations where merchants have a need to conduct business at a reduced traffic capacity (e.g., during a pandemic), curbside pickup may be invaluable as a means to continue and/or increase business while still meeting capacity requirements and restrictions. In normal times, curbside delivery can allow merchants to provide shopping and purchasing alternatives to consumers, thereby making the business available to different types of consumers.

Curbside pickup is not without challenges, however. While supermarkets, retail stores, and some restaurants may have dedicated curbside pickup parking locations or spots that allow consumers to arrive and navigate to, certain technology or other information may be required. For example, those parking spaces may need to have dedicated cameras, parking sensors, and/or other monitoring means, or consumers may need to arrive and then attempt to call or text the merchant to notify them of their arrival. Alternatively, staff of the merchant may need to be constantly on the lookout to determine when a consumer has arrived. Even in these situations, identifying a particular order to be delivered to a particular consumer's vehicle can be difficult to determine in a timely manner, and can cause additional delay and consumer frustration in some cases.

Another issue with current curbside pickup is that many merchants may not have the space or capital required to implement such designated spaces, as related signage, equipment, and other requirements are likely too expensive or impractical. For example, a crowded shopping center with many stores would need to dedicate a number of spaces to each merchant for curbside delivery, with each merchant needing to pay for the spot. Similarly, in a heavy urban area, parking and available spots may be very difficult to park in, much less leave open as a dedicated spot for delivery.

The present solution described herein considers a cheaper and more efficient solution for allowing merchants and consumers to complete curbside delivery processes. In particular, the solution allows the consumer to easily notify the merchant of the current location of the consumer via the consumer's mobile device and an associated application (in some instances), and if applicable, provide the consumer's vehicle description or location information, without requiring a call or SMS message to the merchant store, where the SMS message can cause delay and confusion in the process, requiring a responsive interaction or reading of the text. Further, texting or calling may require additional signage and interactions at both the merchant's side and the consumer's. By providing exact coordinates to the consumer via the application's notification, the merchant is able to immediate correspond a particular order to the consumer, as well as to immediately identify the consumer's location and confirm where the products/order should be taken, regardless of whether there is an available area specifically defined for the curbside delivery or not. Still further, the described process provides a simple verification process to allow merchants to confirm that the consumer to whom an order is being delivered matches the identity of the consumer who actually placed or is associated the order, removing assumptions and/or guesswork. In all, the present solution allows curbside pickup not to be limited to specific parking spaces or delivery areas, while allowing the consumer to easily convey location information and details to the merchant for smooth and seamless product delivery.

FIG. 1 illustrates an example system 100 used to manage one implementation of a set of curbside delivery interactions. A mobile device 101 can be associated with a consumer, and can be used to submit orders via a mobile application or website, which may be represented by the consumer-side version of the curbside pickup application 102. The mobile device 101 can include a location module 104, which may be a part of the application 102 or a separate component. The location module 104 may be or may be associated with a GPS chip or signal, an assisted GPS system (aGPS), or any other suitable chip or functionality that can assist with determining the consumer's location or location coordinates. In some instances, the location module 103 may use beacons or other wireless signals to register, detect, or identify a current location of the consumer, and can pass that information to the curbside pickup application 102. Using the functionality of the location module 104, a current location of the consumer (or the consumer's mobile device 101) upon arrival at or near the merchant (e.g., as defined by the merchant's location 153) can be determined and provided along with a notification to the merchant system 150. In some instances, the notification may be automatically generated without further user interaction, while in others, the consumer can cause the notification to be sent via a manual interaction with the curbside pickup application 102.

In some instances, additional consumer-related information can be provided via the application 102. This information may be part of a consumer profile stored by the merchant system 150 or at the mobile device 101, and can include license plate information, vehicle make and model, a visual description or picture of the consumer, personal demographic information, current clothing, and/or other relevant information provided by the consumer. By providing this information, staff of the merchant performing the delivery may be able to visually verify the consumer prior to providing the goods.

In some instances, the merchant may be associated with a geo-fenced area 154 (e.g., which may be explicitly defined, defined as a relative distance from the merchant's location 153, or otherwise identified by the merchant, etc.). Unless the mobile device 101 is determined to be within that geo-fenced area 154, the mobile device 101 and the application 102 may not offer the option to submit a notification of arrival to the merchant system 150. After arrival within the geo-fenced area 154, which can be illustrated or provided to the consumer via a presentation on the mobile device 101 in some cases, the option to submit the notification, or an automatic notification, can be submitted via the application 102. Upon submission, an identity verification module 103 of the application 102 may be used, in some instances, to generate a unique identifier that can be used by the merchant to verify the consumer's identity upon delivery. The unique identifier can be a barcode, QR code, passcode or string, or any other suitable identifier. In some instances, the unique identifier can be in a scannable format or form, and can allow a staff member of the merchant to capture and confirm the unique identifier using a mobile device of the staff member, or to confirm a printed or otherwise available matching value provided with the order. In some instances, the unique identifier may be the license plate of the consumer, where that consumer remains at or near their vehicle for pickup.

Network 130 be any network, including a cellular (e.g., 5G, LTE, 4G, etc.) system or network, a wired network, and/or wireless network that allows transmission of information from the mobile device 101 to a merchant system 150. Network 130 can be used to transmit and/or share communications, including messages and notifications, between the mobile device 101 and the merchant system 150, as well as to access additional resources. In some instances, the mobile device 101 and the corresponding curbside pickup application 102 can connect to a menu and/or ordering application of or associated with the merchant system 150 via the network 130 (e.g., by using the Internet) to allow consumer to submit their order they are picking up.

The merchant system 150 can be associated with one or more devices at the merchant (e.g., a central computer, multiple mobile devices for staff usage, ordering systems, etc.), and can allow the merchant to manage curbside pickups with multiple consumers. In some instances, the merchant system 150 may be specific to curbside pickup, and can integrate or communicate with separate ordering systems. In other instances, the merchant system 150 may also be part of an ordering system through which the order information is received and processed. The merchant system 150 can include a merchant-side curbside pickup application 151, which can perform operations associated with the present solution for that functionality performed with or by the merchant. As illustrated, the application 151 can include a direction module 152 which can be used to generate specific directions to consumers who have submitted a notification that they are nearby and are available to receive their orders, where those notifications include a particular location (e.g., the location identified by the consumer pickup application 102). The direction module 152 can generate a set of directions that provide specific instructions to the particular location associated with the consumer, and can allow the merchant's agent or employee to easily locate the correct consumer. Additionally, the merchant's curbside pickup application can provide information identifying the consumer, such as the consumer-specific information and/or the corresponding unique identifier, allowing the staff of the merchant to confirm the person to whom they are delivering their product.

In some implementations, the merchant staff, while delivery the products and items to the consumer, may receive periodic or live updates on their travel time, location on the route, and/or other status-related information. Similarly, the consumer may be presented with similar status information, although in some instances, exact location information of the merchant may not be presented. These presentations can provide, to both the consumer and the merchant staff, estimated remaining time until the delivery is completed. By making this information dynamic and responsive to location changes and/or intermediate stops, the time may be updated as new information is received.

Figure 2:
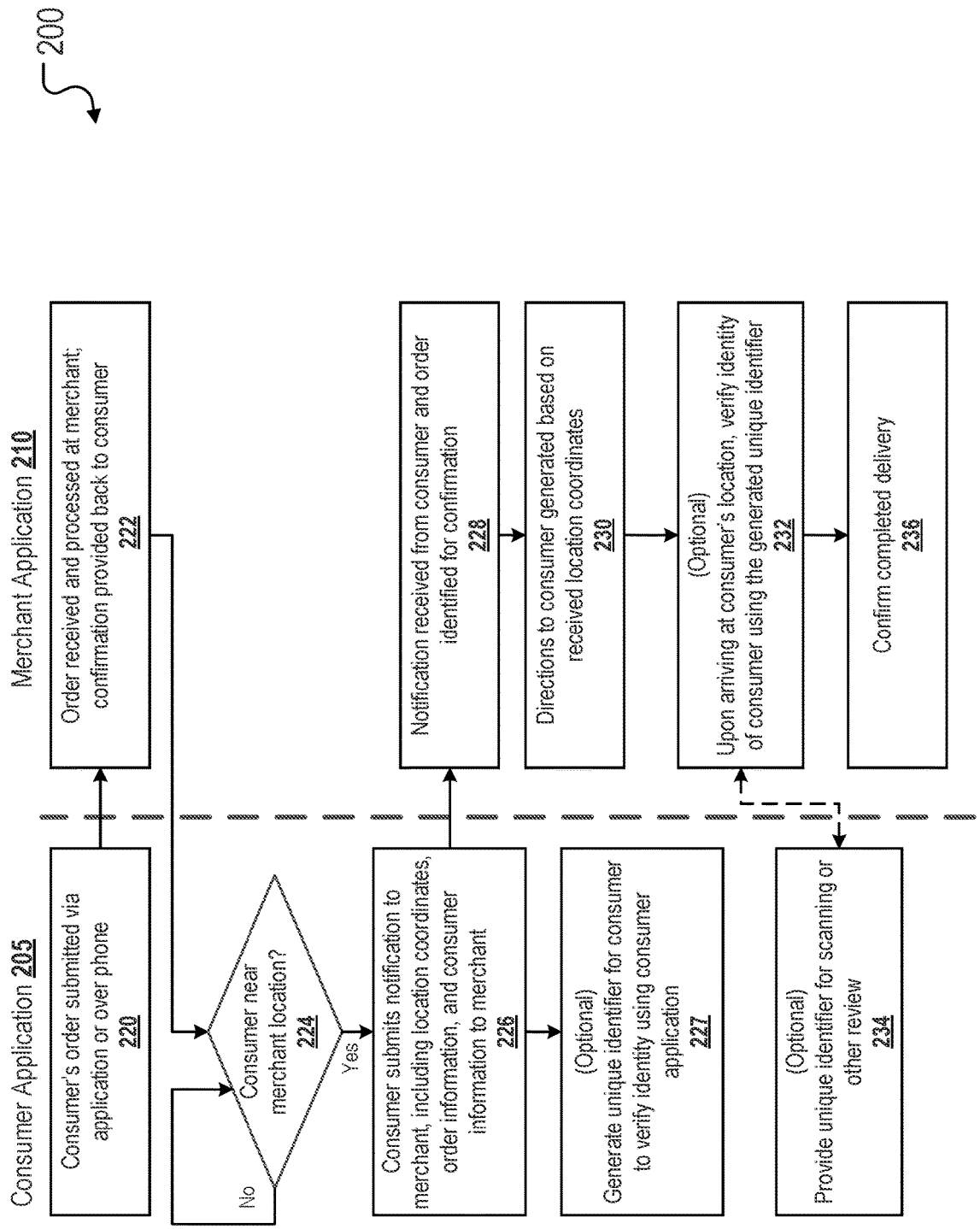
FIG. 2 illustrates a swimlane diagram of example interactions between a consumer application and a merchant application in a curbside delivery transaction, in accordance with implementations of the present disclosure.

FIG. 2 illustrates a swimlane diagram of interactions between a consumer application 205 and a merchant application 210. The consumer application 205 may be similar to the application 102 of FIG. 1, and the merchant application 210 may be similar to the application 151, although other applications may also be used.

At 220, a consumer's order is submitted via the application 205. In other instances, an order can be made via a different or alternative channel (e.g., via phone), and can be associated with the consumer application 205 to allow the curbside delivery operations described herein.

At 222, the order can be received at the merchant application 210, and can be processed by the merchant and prepared. Upon receipt and processing, confirmation may be confirmed with, for example, a time or time range at which the order may be ready for delivery. The time or time range may be based on a relatively level of current business at the merchant, allowing the consumer a timeframe within which to arrive for curbside delivery.

Once the time is determined, a notification can be provided to the consumer and can be visible within and presented at the consumer application 205. The consumer can then arrive at or near the merchant's location at any convenient time. If the order is for food, a tighter window may be required. If the order is for a non-perishable item, a wider range may be provided, and the order may be prepared and available for pickup for a long period (e.g., hours, days, etc.).

While the consumer interacts with the application 205, a determination is made in the application 205 at 224 as to whether the consumer is near the merchant's location (e.g., is within a geo-fenced area at which a notification for curbside delivery can be submitted). If not, method 200 continues, waiting for the consumer to arrive. If, however, the consumer is determined to be near the merchant (e.g., within a certain distance from the merchant location, or within a suitable range or geo-fenced area, or connected to a particular beacon or WiFi connection associated with the merchant), then method 200 can continue at 226.

At 226, the consumer application 205 can submit a notification to the merchant (either automatically or can enable the consumer to submit the notification), which can include the consumer's current location coordinates, an identification of the order being picked up, and any suitable consumer information to be provided to the merchant. Such additional information may include vehicle information, specific notes from the consumer, or photos to show where the consumer is or what the consumer looks like or is wearing, as well as other suitable data. The location coordinates can be determined using any suitable method, including GPS coordinates, a WiFi-based determination of the consumer's location, a beacon-based determination, or others. In some instances, the application 205 may determine when the consumer has arrived within a predetermined distance from the merchant location and is still or stops moving, and can automatically submit the notification to the merchant system. In some instances, should the consumer's position change after the notification but prior to the actual delivery and exchange, then the location information can be updated. In other instances, a button or other interactive element within the consumer application 205 may become activatable or otherwise active within the application 205 once the consumer has arrived within an area at which the notification can be sent. The application 205 can then allow the consumer to activate the button or element to trigger the notification. Information stored on the mobile device, information input by the consumer via the consumer application 205, or information available in a backend system or at the merchant can be included or added to the notification to provide additional information about the order and the consumer, including a location of the consumer.

In some instances, in association with providing the notification, the consumer application 205 may be used to generate a unique identifier (at 227) that can be used to verify the identity of the consumer. The unique identifier can be unique to the consumer, but can also be unique to the order itself. The unique identifier may be scannable, or may be a string of digits and/or symbols. The unique identifier can be provided to the merchant along with the notification, and can be evaluated and verified by the merchant prior to delivery completion. In some instances, the unique identifier may be a signal (e.g., a Bluetooth or NFC-shared set of data) that must be captured and evaluated by the merchant application 210 prior to verification. Further, the unique identifier can later be reviewed and confirmed at the time of delivery to ensure the correct person is receiving the order, as well as to confirm delivery has been completed.

At 228, the notification is received at the merchant application 210 (after the consumer is allowed to send the notification), and the corresponding order is identified for confirmation and fulfillment.

At 230, a set of directions to the consumer can be generated for the merchant (or an employee, agent, or staff thereof) based on the location information received in the notification. The set of directions can identify a particular parking space, or may be associated with a particular location within a geo-fenced or otherwise nearby area allowed for pickup. Information to reach the consumer can include a set of walking directions or a walking route to the particular location, as well as or instead, an identification of a specific pre-defined location within the geo-fenced area at which the consumer is determined to be. In some instances, the generated directions may further include a description of the consumer, which may have been received along with the notification. The description may include a picture of the consumer, a description of clothing worn by the consumer, or a license plate number and car make/model.

At 232, upon arriving at the consumer's location, the identity of the consumer can be verified using the unique identifier provided by the consumer application 205 (at 234). In some instances, the unique identifier generated for the consumer can be verified, either through a scan or visual inspection. In some instances, a wireless signal from the consumer application 205 and corresponding mobile device may be captured and evaluated to confirm the identity of the consumer. In still other instances, a wireless handshake may be performed to confirm the consumer's identity based on the unique identifier. In still other instances, the consumer's license plate can be captured and/or noted to compare to the value on file. A picture may be uploaded to be associated with the order and associated with the transaction to provide proof of delivery.

Once the identity of the consumer is verified and the delivery is completed, the merchant application 210 can be used to confirm delivery at 236. For example, a UI element may be selectable or otherwise activated to confirm delivery has been made. If any further monetary transaction is to be completed, it may be done at that time, including payment, tipping of the staff, or other resolutions to the transaction.

Figure 3:
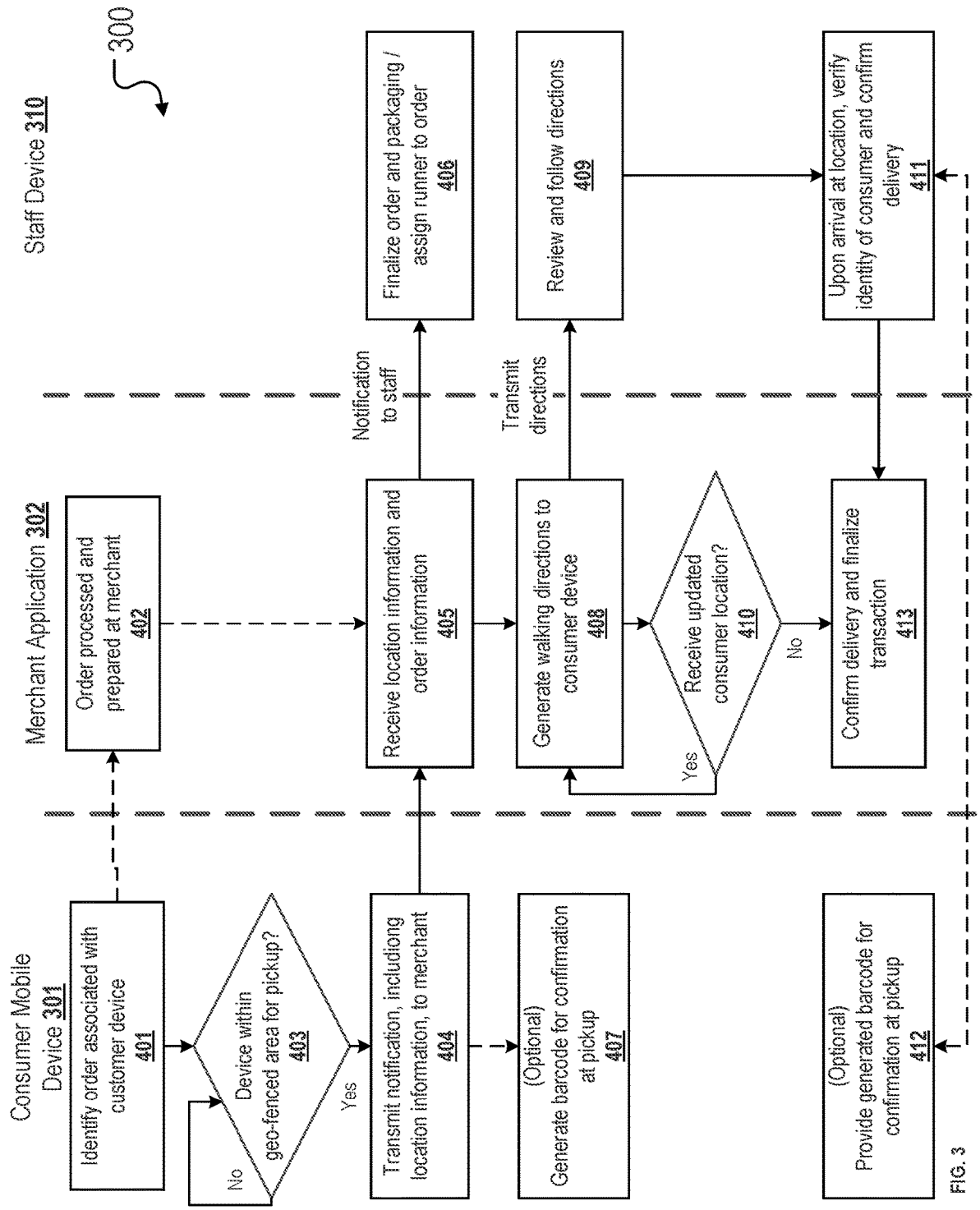
FIG. 3 illustrates a swimlane diagram of example interactions between a customer mobile device, a merchant application executing at or in association with a merchant, and a staff device operated by at least one staff member of the merchant, the interactions occurring in a curbside delivery transaction, in accordance with implementations of the present disclosure.

FIG. 3 illustrates a swimlane diagram of example interactions 300 between a consumer mobile device 301, a merchant application 302 executing at or in association with a merchant, and a staff device 310 operated by at least one staff member of the merchant, the interactions occurring in a curbside delivery transaction, in accordance with implementations of the present disclosure.

As described, the consumer mobile device 301 can include software, including either a standalone app or application, or a web browser accessing the functionality, to order and/or associate an existing order to an account associated with the consumer. In some instances, the order may be made via the consumer mobile device 301, while in others the order may be made via a separate channel, such as phone, by a different digital device or computer, etc. At 401, the order associated with the consumer mobile device 301 is identified. If the order is made on the device, then a communication from the consumer mobile device 301 can be shared or transmitted to the merchant application 302 or system.

The merchant application 302 can be a standalone system associated with the curbside delivery system, or may be implemented into related processing and point-of-sale systems at the merchant. The merchant application 302 may run on a single system, may be cloud-based, and/or may execute on different devices operable by different users at the merchant. At 402, the order for the consumer can be processed and prepared at the merchant. In some instances, the merchant can respond with an estimated time of order completion to allow the consumer information on when to arrive for pickup. The pickup time can be estimated based on a default or normal time for the order, as well as a current level of business at the merchant.

After the order is identified, the consumer mobile device 301 can use location-determination functionality to determine (at 403) whether the mobile device 301 is within a pre-defined area associated with curbside pickup for the merchant. The pre-defined area 403 may be an area defined by geo-fence for the merchant, such as a defined radius from the merchant location. The geo-fence can be provided to the consumer mobile device 301 by an ordering application, by communicating with the merchant system, or by any other suitable method. In some instances, the pre-defined area 403 may be defined as where the device 301 is able to connect to or interact with one or more beacons, WiFi networks, or other location-based sensors, where connecting to or interacting with those components confirms a physical location of the mobile device 301. If the mobile device 301 determines that the consumer is not within the pre-defined area 403, then method 300 continues its determinations until the consumer arrives. If, however, the consumer is determined to be within the pre-defined area, then method 300 continues at 404.

At 404, when the consumer arrives near the merchant store location and is determined to be within the pre-defined area, then the consumer can use the mobile device 301 and its application to submit a notification that the consumer has arrived. For example, a UI button or other element may be presented or may be allowed to be interacted with to trigger the notification for the merchant application 302. In some instances, an automatic notification can be submitted as soon as the consumer mobile device 301 is determined to be within the pre-defined area. In some instances, the device 301 may wait to send the automatic notification until the consumer stops or stays still for a period of time. Along with the notification, the mobile device 301 can submit information including a location of the consumer, a confirmation of the order number, call back information, other identification information, and/or a unique identifier associated with the consumer and/or the particular order.

At 405, the merchant application 302 can receive the notification and location information from the consumer mobile device 301, and can associate or confirm its association with an existing order. The merchant application 302 can send a notification to an associated staff device 310, in some instances after the order is ready, or in some cases prior to the order being ready, that an order is to be delivered. The notification can include information relevant to the delivery, including information about the consumer, as well as location information, among others.

Merchant staff associated with the staff device 310 can refer to employees, contractors, delegates, third-parties, or any person or organization working for the merchant to deliver curbside orders. The staff device 310 can instruct the staff to finalize order and packaging, as well as assign a runner or other staff specifically to complete and deliver the order at 406. In some instances, the staff device 310 may be the same device executing the merchant application 302, or may similarly execute an instance of the merchant application 302.

At 408, the merchant application 408, using the location information received from the consumer mobile device 301, can generate walking directions to the consumer mobile device 301, and therefore the consumer, within the pre-defined area. Those directions may start at the kitchen or order pickup area of the merchant, or at a designated door at which orders are delivered. The walking directions can be precise directions directly to the location at which the consumer is known or derived to be, and can be transmitted to a mobile staff device 310, allowing the staff to take the device with them to perform the delivery. At 409, the staff can review and follow the directions to the consumer.

While the staff is preparing the order and/or in the process of performing the delivery, the merchant application 302 can determine if updated customer location information has been received from the consumer mobile device 301, or otherwise detected as the consumer moves through the pre-defined area. In some instances, constant and/or periodic location updates may be provided or identified, and any changes can be relayed to the merchant application 302. When an update is received, the updated directions can be generated at 408 and provided to the staff device 310. If not, no updates will be sent.

Returning to the staff device 310, after following the directions and arriving at the location of the consumer, at 411, using the staff device 310, a confirmation of the identity of the consumer can be performed, and the delivery can be confirmed. In some instances, the generated barcode can be provided by the consumer via the mobile device 301 to validate and verify the consumer's identity. The generated barcode can be scanned by a camera of the staff device 310, or the generated identifier (if wireless) can be transmitted from the consumer device 301 and captured and confirmed by the staff device 310. In other instances, consumer-specific information, such as a license plate, consumer ID, facial recognition, etc., can be performed to confirm the identity of the consumer.

In some implementations, and as described herein, a consumer does not necessarily have to be in a vehicle or associated with a vehicle to receive curbside pickup. He or she can be a person walking to a nearby spot, on bicycle, or otherwise. Additionally, a person may be meeting merchant staff in an office building where the merchant staff delivers to the site location, and where the consumer can wait at a pre-defined area at which deliveries can be provided.

Certain novel aspects of the subject matter of this specification are set forth in the description and claim provided in this document.

Embodiments of the subject matter and the operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification, the different functions can be implemented using "engines," which broadly refer to software-based systems, subsystems, or processes that are programmed to perform one or more specific functions. Generally, an engine is implemented as one or more software modules or components, installed on one or more computers, in one or more locations. In some cases, one or more computers can be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing models described in this specification can also include, for example, special-purpose hardware accelerator units for processing common and compute-intensive parts of machine learning training or production, i.e., inference, workloads. Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a sub combination.

Similarly, while operations are depicted in the drawings and recited in the claim in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described in this specification. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

The invention claimed is:

1. A computer-implemented method, comprising:
receiving, at a merchant, an order associated with a product, wherein the order is to be fulfilled via curbside delivery, and wherein the order is associated with a first entity;
receiving, at the merchant, a notification of arrival of the first entity within a pre-determined area associated with the merchant, the notification including location information associated with the first entity, wherein the notification of arrival is automatically generated by a mobile device of the first entity in response to the mobile device detecting the first entity arriving within the pre-determined area associated with the merchant;
in response to receiving the notification, generating a set of directions for a second entity to travel to reach the first entity based on the location information associated with the first entity, wherein the second entity is associated with the merchant;
presenting the generated set of directions to the second entity for completing the curbside delivery; and
receiving a confirmation of completed delivery after interaction of the second entity with the first entity at a location of the first entity.

2. The computer-implemented method of claim 1, wherein the location information associated with the first entity included with the notification of arrival includes a current location of a mobile device associated with the first entity within the pre-determined area associated with the merchant.

3. The computer-implemented method of claim 2, wherein the current location of the mobile device associated with the first entity is determined based on a global positioning satellite (GPS) or assisted GPS (aGPS) location obtained by the mobile device at a time the notification of arrival is transmitted from the mobile device.

4. The computer-implemented method of claim 1, wherein the second entity comprises a mobile device associated with a staff member of the merchant.

5. The computer-implemented method of claim 4, wherein presenting the generated set of directions to the second entity for completing the curbside delivery comprises transmitting the generated set of directions to the mobile device associated with the staff member of the merchant.

6. The computer-implemented method of claim 5, wherein the first entity is associated with a unique identifier, wherein the unique identifier is associated with the order, and wherein the unique identifier comprises a driver's license number, a license plate number of a vehicle, a vehicle identification number (VIN) of the vehicle, or a biometric set of information associated with the first entity.

7. The computer-implemented method of claim 6, wherein receiving the confirmation of completed delivery after interaction of the second entity with the first entity at the location of the first entity comprises capturing the unique identifier using a camera of the mobile device of the second entity and comparing the captured unique identifier to the unique identifier associated with the order.

8. A computer-implemented method, comprising:
receiving, at a merchant, an order associated with a product, wherein the order is to be fulfilled via curbside delivery, and wherein the order is associated with a first entity;
receiving, at the merchant, a notification of arrival of the first entity within a pre-determined area associated with the merchant, the notification including location information associated with the first entity, wherein the notification of arrival is manually generated by a mobile device of the first entity, wherein a user interface (UI) element associated with initiating the notification of arrival is unavailable to be activated prior to the first entity's arrival within the pre-determined area associated with the merchant, and wherein the UI element associated with initiating the notification of arrival is available to be activated after the first entity's arrival within the pre-determined area associated with the merchant;
in response to receiving the notification, generating a set of directions for a second entity to travel to reach the first entity based on the location information associated with the first entity, wherein the second entity is associated with the merchant;
presenting the generated set of directions to the second entity for completing the curbside delivery; and
receiving a confirmation of completed delivery after interaction of the second entity with the first entity at a location of the first entity.

9. The computer-implemented method of claim 8, further comprising, after the UI element associated with initiating the notification of arrival is available to be activated, receiving, at the merchant, the notification of arrival based on a manual interaction with the mobile device of the first entity to activate the UI element.

10. The computer-implemented method of claim 8, wherein the location information associated with the first entity included with the notification of arrival includes a current location of a mobile device associated with the first entity within the pre-determined area associated with the merchant.

11. The computer-implemented method of claim 10, wherein the current location of the mobile device associated with the first entity is determined based on a global positioning satellite (GPS) or assisted GPS (aGPS) location obtained by the mobile device at a time the notification of arrival is transmitted from the mobile device.

12. The computer-implemented method of claim 8, wherein the second entity comprises a mobile device associated with a staff member of the merchant.

13. The computer-implemented method of claim 12, wherein presenting the generated set of directions to the second entity for completing the curbside delivery comprises transmitting the generated set of directions to the mobile device associated with the staff member of the merchant.

14. The computer-implemented method of claim 13, wherein the first entity is associated with a unique identifier, wherein the unique identifier is associated with the order, and wherein the unique identifier comprises a driver's license number, a license plate number of a vehicle, a vehicle identification number (VIN) of the vehicle, or a biometric set of information associated with the first entity.

15. The computer-implemented method of claim 14, wherein receiving the confirmation of completed delivery after interaction of the second entity with the first entity at the location of the first entity comprises capturing the unique identifier using a camera of the mobile device of the second entity and comparing the captured unique identifier to the unique identifier associated with the order.

16. A merchant system comprising:
at least one processor; and
one or more memories, the one or more memories coupled to the at least one processor and storing programming instructions for execution by the at least one processor to:
receive, at the merchant system, an order associated with a product, wherein the order is to be fulfilled via curbside delivery, and wherein the order is associated with a first entity;
receive, at the merchant system, a notification of arrival of the first entity within a pre-determined area associated with the merchant system, the notification including location information associated with the first entity, wherein the notification of arrival is automatically generated by a mobile device of the first entity in response to the mobile device detecting the first entity arriving within the pre-determined area associated with the merchant system;
in response to receiving the notification, generate, by the merchant system, a set of directions for a second entity to travel to reach the first entity based on the location information associated with the first entity, wherein the second entity is associated with the merchant system;
present the generated set of directions to the second entity for completing the curbside delivery; and
receive a confirmation of completed delivery after interaction of the second entity with the first entity at a location of the first entity.

17. The merchant system of claim 16, wherein the location information associated with the first entity included with the notification of arrival includes a current location of a mobile device associated with the first entity within the pre-determined area associated with the merchant system.

18. The merchant system of claim 17, wherein the current location of the mobile device associated with the first entity is determined based on a global positioning satellite (GPS) or assisted GPS (aGPS) location obtained by the mobile device at a time the notification of arrival is transmitted from the mobile device.

19. The merchant system of claim 16, wherein the second entity comprises a mobile device associated with a staff member of the merchant system.

20. The merchant system of claim 19, wherein presenting the generated set of directions to the second entity for completing the curbside delivery comprises transmitting the generated set of directions to the mobile device associated with the staff member of the merchant system.

21. The merchant system of claim 20, wherein the first entity is associated with a unique identifier, wherein the unique identifier is associated with the order, and wherein the unique identifier comprises a driver's license number, a license plate number of a vehicle, a vehicle identification number (VIN) of the vehicle, or a biometric set of information associated with the first entity.

22. The merchant system of claim 21, wherein receiving the confirmation of completed delivery after interaction of the second entity with the first entity at the location of the first entity comprises capturing the unique identifier using a camera of the mobile device of the second entity and comparing the captured unique identifier to the unique identifier associated with the order.

23. A merchant system comprising:
at least one processor; and
one or more memories, the one or more memories coupled to the at least one processor and storing programming instructions for execution by the at least one processor to:
receive, at the merchant system, an order associated with a product, wherein the order is to be fulfilled via curbside delivery, and wherein the order is associated with a first entity;
receive, at the merchant system, a notification of arrival of the first entity within a pre-determined area associated with the merchant system, the notification including location information associated with the first entity, wherein the notification of arrival is manually generated by a mobile device of the first entity, wherein a user interface (UI) element associated with initiating the notification of arrival is unavailable to be activated prior to the first entity's arrival within the pre-determined area associated with the merchant system, and wherein the UI element associated with initiating the notification of arrival is available to be activated after the first entity's arrival within the pre-determined area associated with the merchant system;
in response to receiving the notification, generate, by the merchant system, a set of directions for a second entity to travel to reach the first entity based on the location information associated with the first entity, wherein the second entity is associated with the merchant system;

present the generated set of directions to the second entity for completing the curbside delivery; and receive a confirmation of completed delivery after interaction of the second entity with the first entity at a location of the first entity.

24. The merchant system of claim 23, wherein the programming instructions are for execution by the at least one processor to:

after the UI element associated with initiating the notification of arrival is available to be activated, receive, at the merchant system, the notification of arrival based on a manual interaction with the mobile device of the first entity to activate the UI element.

25. The merchant system of claim 23, wherein the location information associated with the first entity included with the notification of arrival includes a current location of a mobile device associated with the first entity within the pre-determined area associated with the merchant system.

26. The merchant system of claim 25, wherein the current location of the mobile device associated with the first entity is determined based on a global positioning satellite (GPS) or assisted GPS (aGPS) location obtained by the mobile device at a time the notification of arrival is transmitted from the mobile device.

27. The merchant system of claim 23, wherein the second entity comprises a mobile device associated with a staff member of the merchant system.

28. The merchant system of claim 27, wherein presenting the generated set of directions to the second entity for completing the curbside delivery comprises transmitting the generated set of directions to the mobile device associated with the staff member of the merchant system.

29. The merchant system of claim 28, wherein the first entity is associated with a unique identifier, wherein the unique identifier is associated with the order, and wherein the unique identifier comprises a driver's license number, a license plate number of a vehicle, a vehicle identification number (VIN) of the vehicle, or a biometric set of information associated with the first entity.

30. The merchant system of claim 29, wherein receiving the confirmation of completed delivery after interaction of the second entity with the first entity at the location of the first entity comprises capturing the unique identifier using a camera of the mobile device of the second entity and comparing the captured unique identifier to the unique identifier associated with the order.

* * * * *